United States Patent [19]

Hirakawa et al.

[11] Patent Number: 5,340,650

[45] Date of Patent: Aug. 23, 1994

[54] VINYL ALCOHOL UNITS-CONTAINING POLYMER COMPOSITE FIBER HAVING RESISTANCE TO HOT WATER AND WET HEAT AND PROCESS FOR ITS PRODUCTION

[75] Inventors: Kiyoshi Hirakawa, Kurashiki; Izumi Watadani, Okayama; Kazuhiko Tanaka; Masao Kawamoto, both of Kurashiki; Takaaki Tanaka, Toyonaka; Hirohumi Sano, Kurashiki; Hayami Yoshimochi, Kurashiki; Masahiro Sato, Kurashiki, all of Japan

[73] Assignee: Kuraray Company Limited, Kurashiki, Japan

[21] Appl. No.: 19,444

[22] Filed: Feb. 18, 1993

[30] Foreign Application Priority Data

Feb. 18, 1992 [JP] Japan ................................. 4-060919
May 29, 1992 [JP] Japan ................................. 4-163607

[51] Int. Cl.$^5$ ............................................. D02G 3/00
[52] U.S. Cl. ................................. 428/373; 57/243; 57/244; 57/255; 428/229; 525/57; 525/58
[58] Field of Search ............... 428/229, 373; 525/57, 525/58; 57/255, 243, 244

[56] References Cited

U.S. PATENT DOCUMENTS

| | | | |
|---|---|---|---|
| 4,584,347 | 4/1986 | Horpell et al. | 525/57 X |
| 5,024,897 | 6/1991 | Mason et al. | 525/57 X |
| 5,141,966 | 8/1992 | Porath | 525/61 X |
| 5,159,013 | 10/1992 | Takida et al. | 525/57 |
| 5,164,438 | 11/1992 | Umeyama et al. | 525/57 X |

FOREIGN PATENT DOCUMENTS

| | | |
|---|---|---|
| 55-1327 | 1/1980 | Japan . |
| 56-5846 | 2/1981 | Japan . |
| 63-120107 | 5/1988 | Japan . |
| 1156517 | 6/1989 | Japan . |
| 1207435 | 8/1989 | Japan . |
| 284587 | 3/1990 | Japan . |
| 2210068 | 8/1990 | Japan . |
| 2249705 | 10/1990 | Japan . |

OTHER PUBLICATIONS

Database WPI, Derwent Publications Ltd., AN 73-809-38U, JP-B-042 808.
Database WPI, Derwent Publications Ltd., AN 72-40885T, JP-B-47 022 098.
Database WPI, Derwent Publications Ltd., AN 73-652-49U, JP-B-48-032-625.

*Primary Examiner*—Judy M. Reddick
*Attorney, Agent, or Firm*—Oblon, Spivak, McClelland, Maier & Neustadt

[57] ABSTRACT

A fiber comprising a vinyl alcohol units-containing polymer, said polymer being modified at the oxygen atoms of its alcoholic hydroxyl groups with a group represented by the following formula I

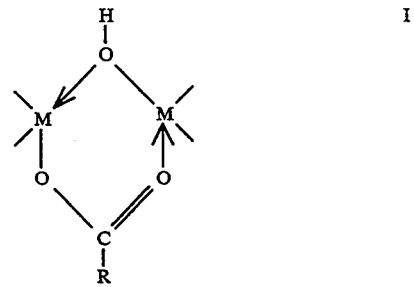

wherein M represents a chelate-forming metal atom and R represents an alkyl group. The fiber has excellent resistance to hot water and wet heat and does not stick, adhere or shrink even when dyed at high temperatures or treated by steam ironing, thus proving to be of markedly high commercial value.

9 Claims, No Drawings ary of the Invention

VINYL ALCOHOL UNITS-CONTAINING POLYMER COMPOSITE FIBER HAVING RESISTANCE TO HOT WATER AND WET HEAT AND PROCESS FOR ITS PRODUCTION

BACKGROUND OF THE INVENTION

1. Field of the Invention

The present invention relates to a fiber comprising a vinyl alcohol units-containing polymer possessing excellent resistance to hot water and wet heat, and a process for the production thereof. Such fibers are particularly useful as reinforcement for rubber materials, such as tires, hoses, conveyer belts and V belts, and plastics, and for general industrial materials, such as ropes, tents, canvases, fishing nets and other tension materials, as well as for textiles such as clothing and towels having excellent hydrophilic property, soil-resistant property, dyeability and the like.

2. Description of the Prior Art

Fibers from vinyl alcohol units-containing polymers, such as polyvinyl alcohol, have superior strength, elastic modulus, weather resistance, chemical resistance, and adhesiveness compared with polyamide, polyester and polyacrylonitrile fibers and are used in many consumer and industrial products. Wider applications in reinforcing rubber and plastics and general-purpose industrial materials should result from the development of a polyvinyl alcohol fiber having still improved resistance to wet heat and fatigue resistance when used in combination with rubber.

Crosslinking polyvinyl alcohol fiber to improve wet heat resistance is known. Japanese Patent Application Laid-Open No. 120107/1988 proposed acetalization; Japanese Patent Application Laid-Open No. 156517/1989 proposed crosslinking treatment with a peroxide crosslinking agent; Japanese Patent Application Laid-Open No. 207435/1989 proposed treatment with an isocyanate; Japanese Patent Application Laid-open No. 84587/1990 proposed crosslinking with an acid; and Japanese Patent Application Laid-open Nos. 210068/1991 and 249705/1990 proposed crosslinking with a metal compound such as alkoxide or acylate.

According to studies by the present inventors, the above proposed processes require a very high degree of crosslinking to improve wet heat resistance sufficiently. However, such a high degree of crosslinking causes the polyvinyl alcohol to decompose and discolor thereby decreasing fiber strength and elastic modulus. A moderate crosslinking results in a slight decrease in strength and elastic modulus but cannot appreciably improve wet heat resistance.

General-purpose synthetic fibers such as polyester or polyamide fibers are inferior to natural fibers such as cotton and jute in hydrophilic property, soil-resistant property, antistatic property and the like, and have monotonous luster and cool feeling. When dyed, such synthetic fibers are inferior to natural fibers such as wool and silk in the brightness of color, and are difficult to dye in deep colors.

Fibers comprising vinyl alcohol units-containing polymers, in particular ethylene-vinyl alcohol copolymer, have been developed to eliminate the above drawbacks of the general-purpose synthetic fibers.

Ethylene-vinyl alcohol copolymer fibers having hydroxyl groups in the molecule thereof, such as the above-described polyvinyl alcohol fiber, possess superior hydrophilic, anti-soiling and anti-static properties, and dyeability compared with polyester and polyamide fibers. However, such ethylene-vinyl alcohol copolymer fibers possess a low melting point and softening point, have poor resistance to heat and hot water, and are readily damaged by treatments with high-temperature water or steam. For example, treating ethylene-vinyl alcohol copolymer fiber by dyeing at a temperature of at least 100° C., steam or conventional ironing of fabrics comprising ethylene-vinyl alcohol copolymer fiber causes the fibers to soften or stick resulting in the fabric becoming rigid and of poor appearance.

Japanese Patent Publication Nos. 1327/1980 and 5846/1981 proposed improving the above drawbacks of ethylene-vinyl alcohol copolymer fiber by producing composite fiber combining ethylene-vinyl alcohol copolymer with another thermoplastic resin such as polyester, polyamide or polypropylene having better thermal resistance than that of ethylene-vinyl alcohol copolymer. However, when such composite fibers are treated with high-temperature dyeing bath or steam ironing, the ethylene-vinyl alcohol copolymer exposed on the surface of the composite fiber partially softens or sticks. Accordingly, fabrics containing such composite fibers and thus treated are of poor quality because of stiffness, faded luster and poor appearance.

In order to dye fabrics comprising the composite fiber containing ethylene-vinyl alcohol copolymer component without causing the above problems, it is necessary to maintain the dyeing temperature at not more than 90° C. so that no softening or sticking of the copolymer occurs. However, at such a low dyeing temperature, the thermoplastic resin such as polyester or polyamide used for forming the composite fiber cannot be sufficiently dyed causing the composite fiber to be dyed unevenly.

SUMMARY OF THE INVENTION

Accordingly, an object of the present invention is to provide a vinyl alcohol units-containing polymer fiber having excellent resistance to hot water and wet heat.

Another object of the present invention is to provide a textile product comprising the above fiber and being usable for industrial and clothing purposes, said product having excellent resistance to hot water and good hand with bulk, ironing, no sticking or adhesion or stiffening of hand, deterioration of appearance or elimination of luster.

Still another object of the present invention is to provide a process for producing the above vinyl-alcohol based polymer fiber having excellent characteristics, with no troubles or undesirable discoloration.

As a result of an intensive study to solve the above problems, the present inventors found that modifying a fiber, yarn or textile product comprising a vinyl alcohol units-containing polymer with a specific chelate compound improves the resistance to hot water and wet heat of the vinyl alcohol units-containing polymer.

Thus, the present invention provides a fiber comprising a vinyl alcohol units-containing polymer, said polymer modified at the oxygen atoms of its alcoholic hydroxyl groups with a group having the following formula I

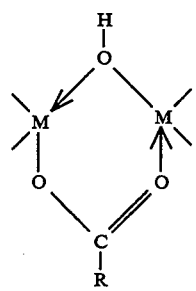

I wherein M represents a chelate-forming metal atom and R represents an alkyl group.

The present invention also provides a composite fiber comprising (a) a vinyl alcohol units-containing polymer component and (b) another fiber-forming polymer component, wherein said polymer constituting component (a) is modified at its alcoholic hydroxyl groups with a group represented by the above general formula I.

DETAILED DESCRIPTION OF THE PREFERRED EMBODIMENTS

The vinyl alcohol units-containing polymer used in the present invention may be a homopolymer comprising repeating units of only vinyl alcohol, i.e., polyvinyl alcohol, and may be a copolymer comprising repeating units of vinyl alcohol and olefin monomers such as ethylene or propylene. In the latter case, it is desirable that the vinyl alcohol units be contained in an amount of 30 to 70 mol % to ensure spinnability.

Further in view of melt spinnability, it is preferred that the polymer used in the present invention be olefin-vinyl alcohol copolymer. Preferably, olefins to be copolymerized are α-olefins having 2–4 carbon atoms, such as ethylene, propylene, butylene and isobutylene, among which ethylene is most preferred in view of the resistance to heat and hot water and dimensional stability of the resulting fiber.

Representative examples of the "vinyl alcohol units-containing polymer" used in the invention include polyvinyl alcohol and ethylene-vinyl alcohol copolymer. Polyvinyl alcohol is formed into fiber by solution spinning and ethylene-vinyl alcohol copolymer is formed into fibers by solution spinning or melt spinning. Thus, vinyl alcohol units-containing polymers are not always formed into fiber by the same spinning process.

The present invention provides a fiber or composite fiber having excellent resistance to hot water and wet heat by treating a fiber formed substantially from a vinyl alcohol units-containing polymer or composite fiber containing a vinyl alcohol units-containing polymer component, with a specific agent. The specific agent used in the present invention comprises a compound, having the following formula II that gives the above-described formula I

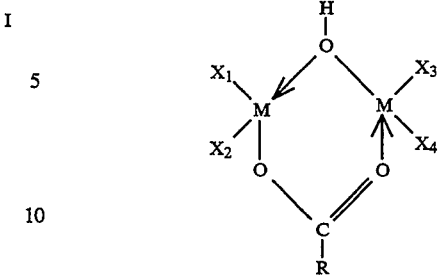

II wherein M represents a chelate-forming metal atom, R represents an alkyl group, and $X_1$, $X_2$, $X_3$ and $X_4$, which may be the same or different, represent a halogen atom or a hydroxyl group.

The present invention also provides a textile product comprising the fiber or composite fiber thus treated.

Hereinbelow, while the present invention is explained, for better understanding thereof, by reference to polyvinyl alcohol and fiber formed therefrom and ethylene-vinyl alcohol copolymer and fiber formed therefrom, the invention is never limited to these polymers and fibers therefrom.

Polyvinyl alcohol (hereinafter referred to as "PVA") used in the present invention may be obtained by saponification of polyvinyl acetate and has a viscosity average degree of polymerization of at least 1,000 and a degree of saponification of at least 98.5 mol %, preferably at least 99.0 mol %. Preferably, the polymer is a straight-chain polymer having a low degree of branching. The degree of polymerization is preferably at least 6,000, more preferably at least 10,000, since a higher degree of polymerization generally provides better resistance to hot water and wet heat.

To produce a fiber, PVA is dissolved in a solvent and the solution is extruded through a nozzle to form a stream from which the solvent is then removed. Exemplary solvents include polyhydric alcohols such as glycerine, ethylene glycol, diethylene glycol, triethylene glycol and 3-methylpentan-1,3,5-triol, dimethyl sulfoxide (DMSO), dimethylformamide, dimethylacetamide, N-methylpyrrolidone, 1,3-dimethyl-2-imidazolidinone, ethylenediamine, diethylenetriamine and water. These solvents may be used alone or in combination. Also usable are aqueous solutions of inorganic salts such as zinc chloride, magnesium chloride, calcium thiocyanate and lithium bromide capable of dissolving the polymer. To ensure good spinnability, it is preferable to use polyhydric alcohols that gel by cooling and mixed solvents of such polyhydric alcohols with water, and dimethyl sulfoxide and dimethylformamide and mixed solvents of the foregoing with water.

In preparing the PVA solution for spinning, the PVA concentration is generally in a range of 3 to 50% by weight. When PVA having a degree of polymerization of at least 6,000 is spun by wet spinning or dry-jet-wet spinning, the PVA concentration is preferably in a range of 3 to 10% by weight in view of the properties of the resulting fiber.

The PVA solution may be spun by any known process including wet spinning, dry spinning, and dry-jet-wet spinning. However, it is preferable to employ, among these processes, a dry-jet-wet spinning which comprises extruding a PVA solution through a spinneret and, passing the air atmosphere, into a low-temperature bath containing an alcohol such as methanol or ethanol or mixtures thereof with the solvent or an aqueous solution containing an inorganic salt or alkali, to quench the extruded streams. This process gives homogeneous and transparent gel fiber.

It is recommended, for the purpose of preventing the gel fiber from deforming its cross-section or sticking, as well as destroying fine crystals formed during extrusion and increasing the drawability, to wet draw the gel fiber as it contains the solvent in a ratio of at least 2, more preferably at least 4. The fiber is then subjected to extraction with an extracting agent, e.g., an alcohol such as methanol or ethanol, acetone and water, which removes almost all the solvent, and dried to evaporate the extracting agent.

The as-spun fiber thus obtained is further drawn with dry heat. In the present invention, the above-described compound II (hereinafter referred to as "chelate compound II") is applied to the fiber as spun or after heat drawing and the fiber with the compound is heat treated, whereby the PVA is modified at alcoholic hydroxyl groups with the compound.

Ethylene-vinyl alcohol polymer (hereinafter referred to as "Et/VA copolymer") used in the invention comprises repeating units from ethylene and vinyl alcohol and is, as described above, formed into fiber by solution spinning or melt spinning. Fibers having excellent resistance to hot water and wet heat are generally obtained by melt spinning. The Et/VA copolymer preferably contains vinyl alcohol units in an amount of 30 to 70 mol % based on the total repeating units, more preferably 40 to 70 mol %.

If the content of ethylene units in the Et/VA copolymer is less than 30 mol % or if the content of vinyl alcohol units exceeds 70 mol %, the spinnability of the polymer by melt extrusion usually becomes poor, causing many filament and yarn breaks during spinning and drawing. In addition, the obtained fiber will lack softness. Such a low content of ethylene units also causes problems when it is used to prepare a composite fiber comprising an Et/VA copolymer component and another fiber-forming polymer component having a high melting point, such a polyethylene terephthalate. A low-ethylene Et/VA copolymer cannot withstand high temperature of at least 250° C. generally employed for spinning, thereby fails to provide a good composite fiber.

If the ethylene content exceeds 70 mol %, the ratio of hydroxyl groups in the Et/VA polymer becomes so low that the resulting fiber has too poor hydrophilic property to have a hand resembling that of natural fibers. In addition, the ratio of modification with chelate compound II will decrease so that it becomes difficult to obtain the intended fiber or textile product having excellent hot water resistance and good softness with bulk.

The Et/VA polymer may be a linear polymer with no crosslinking or may be crosslinked in an appropriate manner. Exemplary crosslinking agents include monoaldehydes, dialdehydes and diamines, among which dialdehydes, in particular 1,9-nonanedial, are preferred in view of crosslinking reactivity. The crosslinking agent is added to the fiber preferably upon application of chelate compound II to increase production efficiency.

The ET/VA copolymer can be obtained by various process and is generally prepared by saponification of vinyl acetate component of ethylene-vinyl acetate copolymer. It is desirable that the degree of saponification be at least about 95%. Lower saponification degrees decrease the crystallinity of the copollaner, thereby decreasing the properties such as strength of the resulting fiber and causing the polymer to tend to soften, which creates troubles during fiber formation by melt spinning and leads to the obtained fiber being of poor softness.

It is recommended that the Et/VA copolymer used for melt spinning have a viscosity average degree of polymerization of 300 to 1,500, preferably 400 to 1,200. Such Et/VA copolymers are readily available, as being on sale from KURARAY CO. under the trade name of EVAL ® or from The Nippon Synthetic Chemical Industry Co. under SOARNOL ®. It is also possible to purchase a commercially available ethylene-vinyl acetate copolymer and then saponifying it, or to obtain an ethylene-vinyl acetate copolymer from ethylene and vinyl acetate by radical polymerization or the like and then saponify the ethylene-vinyl acetate copolymer.

In any case, it is desirable that the Et/VA copolymer used contain as small amounts as possible of alkali metal ions such as sodium ion and potassium ion and alkali earth metal ions such as calcium ion and magnesium ion. Generally they should not be contained in amounts exceeding about 100 ppm, preferably should be contained in amounts below 50 ppm. This is because their presence causes breakage of the main chain, dropping off of branched chains, and excessive crosslinking causing decrease in the thermal stability of the copolymer, frequent fiber breakage during spinning due to gelation of the copolymer and clogging of spinning filter and the resulting steep increase of spinneret pack pressure and shortening of spinneret life.

In the fiber and textile product of the present invention, it is necessary that the vinyl alcohol units-containing polymer used, such as PVA or Et/VA copolymer, be modified at its alcoholic hydroxyl groups with at least one of the group I. In other words, the vinyl alcohol units-containing polymer may be modified with one group I or with two or more of groups I.

In the group I or chelate compound II, it is desirable that the alkyl group represented by R be a higher alkyl group having 5 to 20 carbon atoms and, particularly, a heptyl group or stearyl group. Examples of the chelate-forming metal atom M are chrome, iron, zirconium, cobalt, nickel, titanium, aluminum and tin. Among these metal atoms, chrome assures good stability of the resulting group I or chelate compound II and aluminum realizes the resulting fiber with almost no discoloration and is hence suitable for obtaining fibers to be dyed in light colors. While chrome also gives fibers dyeable in light colors, the fibers may suffer from slight discoloration inherent to chrome.

In the chelate compound II, $X_1$, $X_2$, $X_3$, and $X_4$ are each independently a halogen atom such as chlorine, iodine, bromine or fluorine or a hydroxyl group. Chlorine is preferred among halogen atoms. $X_1$, $X_2$, $X_3$ and $X_4$ may all be the same or some of them may be halogen atoms with the rest being hydroxyl group.

Preferred examples of the chelate compound II are represented by formulas IIa and IIb (hereinafter referred to as "compound IIa" and "compound IIb", respectively. The compound IIa is available under the trade name of ZEVLAN CR-N from Ipposha Oil Industries.

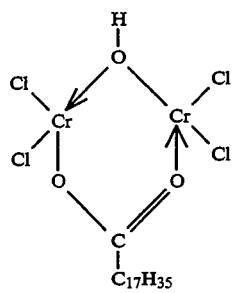

Compound IIa

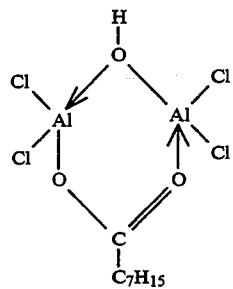

Compound IIb

The reaction mechanism involved in modifying fibers comprising a vinyl alcohol units-containing polymer with chelate compound II is not completely clear. However, it is believed to be described below.

When $X_1$, $X_2$, $X_3$ and $X_4$ are chlorine atoms, part of the alcoholic hydroxyl groups of a vinyl alcohol units-containing polymer are bonded to at least one of $X_1$ through $X_4$ by dehydrochlorination, and the vinyl alcohol units-containing polymer is thus modified at the oxygen atoms of the alcoholic hydroxyl group, with a group represented by formula I'

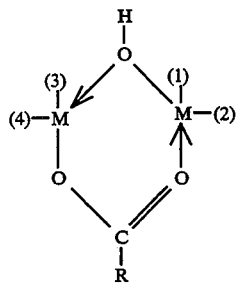

wherein M represents a chelate-forming metal atom, R represents an alkyl group and (1) through (4) represent bonding hands.

In the above group represented by formula I', when at least one of the bonding hands (1) through (4) is bonded to the oxygen atom of the alcoholic hydroxyl group of the vinyl alcohol units-containing polymer, the following cases are considered to be applicable to the rest of the bonding hands. They may be bonded to the oxygen atom of the alcoholic hydroxyl group of another molecule of the vinyl alcohol units-containing polymer, they may have changed to hydroxyl groups and remain as such, they may be bonded to any one of the bonding hands of other free chelate compound II to form a polymer of chelate compound II, or any combination thereof. In any case, chelate compound II is chemically bonded to the final alcohol units-containing polymer and contained therein, so that it is hardly separatable from the polymer by washing, dyeing or like treatments. Where chelate compound II is bonded to part of the alcoholic hydroxyl groups of the vinyl alcohol units-containing polymer and, at the same time, forms polymers of chelate compound II by function of the rest of its bonding hands, there is formed on the surface of the fiber comprising the vinyl alcohol units-containing polymer a coating film formed of polymers of chelate compound II.

It is desirable that the ratio of modification with group I of the vinyl alcohol units-containing polymer fiber be 0.02 to 2 mol %, preferably 0.1 to 1.0 mol %, based on the moles of the vinyl alcohol units. The term "the moles of the vinyl alcohol units" herein means total moles of vinyl alcohol units which have been saponified, unsaponified vinyl acetate units and vinyl alcohol units with their hydroxyl groups having been converted to ether groups by acetalization.

If the ratio of modification with group I is less than 0.02 mol %, the resulting fiber will not have sufficient resistance to hot water and wet heat. However, if the ratio exceeds 14 mol %, the vinyl alcohol units-containing polymer thus modified will tend to decompose so that the fiber therefrom becomes coarse and has decreased mechanical properties.

Modification with group I is conducted in any one of the following manners. For example, an as-spun fiber is produced from PVA by solution spinning process and a treating agent containing chelate compound II is applied to the as-spun fiber before or after drawing. The treating agent may be added to the spinning dope or the solvent-extracting bath as long as it does not adversely affect spinnability and drawability. Or, for example a fiber or composite fiber is produced from an Et/VA copolymer by melt spinning and the treating agent is applied to the fiber or yarns or textile products made therefrom. It is also possible to use commercially available Et/VA copolymer fibers, yarn and textiles and treating them with the treating agent. After application of the treating agent by any one of the above processes, the fiber or the like is heat treated to complete the modification.

Generally, chelate compound II is used in the form of an aqueous solution or alcoholic solution with its concentration being preferably in a range of 0.3 to 3% by weight. When hydrochloride forms from the chelate compound II alone or by its reaction with water, it is desirable to add a neutralizing agent to the solution to prevent corrosion in the treating vessel due to the hydrochloride. Examples of neutralizing agents include hexamethylenetetramine, sodium hydroxide and sodium carbonate. Hexamethylenetetramine is preferred in view of stability upon heating. The neutralizing agent is preferably added in an amount of 2 to 10% by weight based on the weight of chelate compound II, more preferably 4 to 6% by weight on the same basis.

When fibers comprising vinyl alcohol units-containing polymer are treated with chelate compound II, they may be treated by any process with no specific limitation, insofar as the modification is conducted smoothly. Exemplary treating processes include immersion of a fiber comprising vinyl alcohol units-containing polymer in a treating agent containing chelate compound II; application of the treating agent to the fiber and spraying of the treating agent to the fiber. For textile products comprising fabrics and nonwoven fabrics, padding-squeezing with mangle is recommended. In this process, a textile product is immersed beforehand in the treating agent at a temperature below 40° C. for a prescribed time with vibration, so that it swells to an extent not to cause the constituting fiber to stick to each other and the treating agent diffuses uniformly into the fiber. The product is then subjected to padding-mangle squeezing. This process provides the finished product with a good bulky feeling.

It is recommended, in the above immersion treatment at 40° C. or below, to add to the treating bath at least one hydroxyl group-containing compound selected from glycerine, ethylene glycol, polyethylene glycol and isopropyl alcohol in an amount of not more than 10% by weight based on the weight of chelate compound II. This addition can promote diffusion and penetration of the chelate compound II into vinyl alcohol units-containing polymer, thereby shortening the treating time and increasing the ratio of modification with group I. However, if the amount of the above hydroxyl group-containing compound exceeds 10% by weight, the hot water resistance of the treated fiber or textile product will decrease.

The fiber or the like comprising vinyl alcohol units-containing polymer and having been provided with chelate compound II is, generally, dried at a temperature of not more than 100° C. to evaporate off moisture and the like and then heat treated to complete modification.

Fibers comprising PVA are, in general, suitably used for reinforcing rubber materials, plastics and cement and other general industrial materials. Such fibers comprising PVA are, after application of chelate compound II, heat treated and/or drawn at a temperature of 150° to 260° C. which promotes crosslinking providing high-strength PVA fibers.

Fibers comprising Et/VA copolymer are, in general, suitably used for textile clothing products such as woven and knit clothing which have different end-uses from those of the above fibers from PVA. Such fibers comprising Et/VA copolymer are, after application of chelate compound II, heat treated at a temperature of not more than the melting point of the Et/VA copolymer, preferably at a temperature of at least 100° C. and 5° to 10° C. lower than the melting point, to complete modification. With the heat treating temperature being lower than 100° C., the crosslinking reaction is not sufficiently effected. It is desirable to conduct preheat treatment before application of chelate compound II, which will more markedly improve the hot water resistance after the modification.

The heat treatment, as well as the above preheat treatment, can be conducted by dry heating, such as infrared ray heating and heating with hot air containing no moisture, hot steam heating, treatment with a high-pressure steamer, and high-frequency heating in the presence of vapor. Dry heating is desirable because it assures satisfactory effect of improving hot water resistance and good reactivity of the chelate compound II with Et/VA copolymer.

It is recommended to heat treat a fiber comprising Et/VA copolymer under relaxed condition. The fiber can develop crimps and provide a bulky yarn or a bulky fabric.

The fiber of the present invention which has been treated with a chelate compound II after heat treatment at a high temperature has excellent resistance to hot water and wet heat and can withstand high-temperature dyeing.

Upon dyeing, the use of a dye bath containing boric acid with or without a salt of strong acid and strong alkali is recommended. Then, dyeing at a high temperature of at least 95° C. does not cause sticking, shrinkage or deterioration of the fiber and assures excellent dye absorption, thereby providing a dyed matter having excellent hand, color and appearance.

When boric acid alone is added to the dyeing bath, it is desirable to add boric acid in a concentration of at least 2 g/l, and more preferably at least 5 g/l. When both boric acid and a salt of strong acid and strong alkali are added, it is desirable to added boric acid in a concentration of at least 1 g/l and the salt in a concentration of at least 1 g/l. With the concentration being less than the above, fibers comprising Et/VA copolymer may stick, shrink, or deteriorate when subjected to high-temperature, high-pressure dyeing at at least 110° C.

Exemplary salts of strong acid and strong alkali to be used in combination with boric acid include sodium sulfate, potassium sulfate, sodium chloride and potassium chloride, among which sodium sulfate is preferred.

Use of the above dyeing bath is particularly effective for composite fibers comprising the Et/VA copolymer component and other fiber-forming polymer component, such as polyester, requiring high-temperature dyeing. High dyeing temperatures are typically employed for conventional polyester fiber, and for composite fibers comprising an Et/VA copolymer component and a polyester component, a dyeing temperature of at least 110° C., preferably at least 120° C., is recommended.

Dyeing at a high temperature of at least 110° C. of the composite fiber of the present invention, which comprises for example Et/VA copolymer component having been provided with chelate compound II and subjected to the above heat treatment, and polyester component, or fabrics or the like comprising the composite fiber, realizes excellent dye adsorption into both the Et/VA copolymer and polyester to produce a bright color, and causes no sticking, shrinkage or deterioration of the Et/VA copolymer component. As a result, excellent dyed article having good luster, hand and appearance without whitening or hardening upon dyeing can be obtained.

In the composite fiber of the present invention, it is desirable that the composite ratio between the modified vinyl alcohol units-containing pollaner component and another fiber-forming polymer component be in a range of 10:90 to 90:10 by weight. If the ratio is outside this range, the spinnability tends to become poor.

The other fiber-forming polymer used for the composite fiber is preferably a crystalline fiber-forming polymer having a melting point of at least 150° C. in view of thermal resistance and dimensional stability and its representative examples including polyesters, polyamides, polyolefins and polyvinyl chloride.

Exemplary polyesters usable for the above purpose include fiber-forming polyesters obtained from aromatic dicarboxylic acids such as terephthalic acid, isophthalic acid, naphthalene-2,6-dicarboxylic acid, phthalic acid, $\alpha,\beta$-(4-carboxyphenoxy)ethane, 4,4-dicarboxydiphenyl and sodium 5-sulfoisophthalate; aliphatic dicarboxylic acids such as adipic acid and sebacic acid; or esters of the foregoing and diols such as ethylene glycol, diethylene glycol, 1,4-butanediol, 1,6-hexanediol, neopentyl glycol, cyclohexane-1,4-dimethanol, polyethylene glycol and polytetramethylene glycol. Among these polyesters, those comprising ethylene terephthalate units and/or butylene terephthalate units in an amount of at least 80 mol %, particularly at least 90 mol %, based on total structural units are preferred.

Exemplary polyamides include nylon 4, nylon 6, nylon 66 and nylon 12; and those of usable polyolefins are polypropylene and ethylen-propylene copolymer.

The composite fiber may assume any optional composite configuration, such as sheath-core, sea-island, side-by-side or combinations of the foregoing. With sheath-core type configuration, either 2-layer or 3-layer sheath-core type may be used. With sea-island type, the shape, number and distribution state of the islands can be optionally selected and, further, part of the islands may be exposed on the fiber surface. With side-by-side type, the boundary plane may, in the fiber cross-section perpendicular to the fiber length, be linear, of arc shape or of any optional curve; further a plurality of patched portions may be parallel or radially positioned; or any other side-by-side configuration is applicable.

In the present invention, the other fiber-forming polymer component to be combined with the vinyl alcohol units-containing polymer component may comprise single polymer component or 2 or more polymer components.

The process of the present invention is particularly effective for those composite fibers in which the vinyl alcohol units-containing polymer component is exposed on part or the entire circumference of the fiber surface.

The fiber or composite fiber of the present invention may have any cross-sectional shape, including circular and irregular. With irregular cross-sectional shapes, there may be used flat and elliptic shapes, angular shapes such as triangular through octagonal, T-shape, multilobal shapes such as tri- through octalobal, hollow shape and the like.

The fiber or composite fiber of the present invention may, as necessary, contain optional additives generally used with fiber-forming polymers, such as optical brighteners, stabilizers, flame-retardants and colors.

The fiber or yarn of the present invention may any one of continuous filament yarns such as monofilament and multi-filament yarns, short fibers such as staples and spun yarns; and combined yarns, blended yarns, plied yarns and the like formed in combination with natural fibers, semisynthetic fibers or other synthetic fibers. The fiber or yarn of the present invention may have been subjected to any optional treatment, such as false-twisting crimping or entangling. The textile product of the present invention includes those comprising the fiber or yarn of the present invention, such as woven and knit fabrics, nonwoven fabrics, finished clothing, towels, reinforcing materials for rubber, plastics, cement and the like and like general industrial textile products.

Where the fiber or composite fiber of the present invention is blended or woven or knit into union cloths, with natural fibers such as cotton, silk, jute and wool, the presence of such natural fibers may hinder the vinyl alcohol units-containing polymer from being modified with chelate compound II, thereby suppressing the effect of increasing resistance to hot water and wet heat. In such cases, it is recommendable to first modify with chelate compound II the fiber or composite yarn comprising vinyl alcohol units-containing polymer in the form of reel, yarn or cheese, and thereafter blending or weaving or knitting into union cloths with such natural fibers. This process assures improvement in resistance to hot water and wet heat.

While the fiber or composite fiber of the present invention comprising, for example, Et/VA copolymer can by itself provides textile products such as fabrics having soft hand, those having still softer elastic fabrics can be obtained by a process which comprises the successive steps of:

processing such fiber or composite fiber before modification with chelate compound II into a circular knitted fabric, modifying the knitted fabric with chelate compound II, heat treating the fabric at a high-temperature to give crimps thereto, unknitting the fabric to obtain a crimped yarn, and weaving or knitting the crimped yarn alone or in combination with natural fiber.

Other features of the invention will become apparent in the course of the following descriptions of exemplary embodiments which are given for illustration of the invention and are not intended to be limiting thereof.

In the Examples and Comparative Examples that follow, various properties were obtained in accordance with the following methods.

(1) Determination of the ratio of modification of vinyl alcohol units-containing polymer with chelate compound II The ratio of modification is the ratio between the mol % modified and 100 mol % of vinyl alcohol units and is calculated from the content of the metal atom in the modified vinyl alcohol units-containing polymer fiber sample which is measured by atomic absorption analysis. For Et/VA copolymer, the vinyl alcohol units content is calculated by subtracting the copolymerization ratio of ethylene (mol %) from 100.

(2) Viscosity average degree of polymerization ($P_A$)

A sample is acetylated to convert the vinyl alcohol units-containing polymer to the corresponding vinyl acetate units-containing polymer, which is then dissolved, in acetone for polyvinyl alcohol fiber or in 85%-water-containing phenol for Et/VA copolymer fiber, in five different concentrations. The acetone solutions are measured for specific viscosity to obtain an intrinsic viscosity, [$\eta$], from which $P_A$ is obtained by:

$$P_A = ([\eta] \times 1{,}000/7.94)^{1/0.64}$$

For Et/VA copolymer fiber, the [$\eta$] obtained is, without conversion to degree of polymerization, used as an index therefor.

(3) Hot water breaking temperature (WTb)

A bundle of 25 single filaments, loaded with 200 mg, is hung at the middle height of a vertical glass cylindrical container filled with water and sealed. The water is heated from around the container at a temperature elevation rate of 1° to 2° C./min, and the temperature at which the specimen bundle breaks is recorded.

(4) Tensile test of single filament

JIS L-1013 is applied. A single filament specimen previously conditioned is patched on a substrate paper in such a manner that the resulting gauge length becomes 10 cm. The specimen on the paper is allowed to stand at 25° C., 60% RH for at least 12 hours. The specimen is tested for breaking load and elongation and initial modulus using an Instron 1122 with a 2-kg chuck and an initial load of 1/20 g/d and at an extension rate of 50%/min. A mean value of $n \geq 20$ is reported. The specimen is loaded with 1/10 g/d and cut to 30 cm, which is then weighed, to obtain the fineness. Here, the single filaments having been tested for the fineness are subjected to the above tensile test so that the tensile test results correspond to the fineness values.

(5) Resistance to heat ageing (strength retention after dry heat treatment)

A yarn specimen, placed in a hot air oven under relaxed condition, is dry heat treated at 160° C. for 24 hours or for 48 hours. Then the yarn strength is measured and the strength retention (%) based on the strength before the dry heat treatment is calculated.

(6) Fatigue resistance in rubber

A plied cord sample having a fineness of about 5,000 deniers is RFL-treated. Twenty pieces of the treated cords are laid parallel on a raw rubber sheet and another raw rubber sheet is laid thereon. On the latter raw rubber sheet another 20 pieces of the treated cords are laid parallel, to form 2 layers of parallel laid cords. The laminate thus formed is vulcanized to give a rectangular belt. The belt to subjected to compression fatigue test at 100° C. for 30,000 times on a belt bending tester with a pulley diameter of 25 mm. The cords of the compression part are taken out from rubber and tested for strength. The strength retention is calculated and taken as an index of fatigue resistance.

(7) Degree of exhaustion of dye

The dye solutions before and after dyeing are diluted with a 1/1 by volume mixed acetone/water solvent. The diluted solutions are tested for absorbancy and the degree of exhaustion is obtained according to the following formula:

$$\text{Degree of exhaustion (\%)} = \{(A-B)/A\} \times 100$$

where
A=absorbancy at the maximum absorption wavelength of the dye solution before dyeing, and
B=absorbancy at the maximum absorption wavelength of the dye solution after dyeing (8) Shrinkage of fabric after dyeing The fabric samples before and after dyeing are measured for warp density with a decimeter and the shrinkage is obtained according to the following formula:

$$\text{Shrinkage (\%)} = \{(E-D)/E\} \times 100$$

where
D=warp density before dyeing (pieces/inch), and
E=warp density after dyeing (pieces/inch).

(9) Evaluation of hot water resistance of Et/VA copolymer fiber

The fabrics obtained in Examples and Comparative Examples were checked for luster and hand before and after dyeing. The fabrics were, while being covered with another cloth, subjected to steam ironing, after which they were checked for change of hand.

EXAMPLES 1 THROUGH 3 AND COMPARATIVE EXAMPLES 1 AND 2

PVA's each having a viscosity average degree of polymerization of 4,000 (Example 1), 8,000 (Example 2) or 17,000 (Example 3), and all having a saponification degree of 99.8 mol % were added to dimethyl sulfoxide (DMSO) in such amounts to make the concentration 11% by weight, 7.5% by weight and 4.5% by weight, respectively, and dissolved therein at 100° C. The obtained solutions were separately extruded through a spinneret with 150 holes having a diameter of 0.12 mm, 0.15 mm and 0.18 mm, respectively. The extruded streams were, by dry-jet-wet spinning, introduced down into a coagulating bath comprising methanol/DMSO=7/3 by weight at 5° C. and taken up a rate of 4 m/min. The as-spun yarns thus obtained were each drawn in the same bath by 1.5 times, and wet drawn through a methanol bath at 40° C. to a total draw ratio of 4.0 and then almost all of the solvent was removed with methanol.

Thereafter, a 1% by weight solution of a chelate compound II with M=Cr, R=$C_{17}H_{35}$ and $X_1$-$X_4$=OH in methanol was applied to the yarns, and the yarns were dried at 90° C.

The yarns were then dry heat drawn through 2 hot air oven. The temperatures and the total draw ratios were: 170°–230° C. and 21.0 for Example 1, 170°–240° C. and 20.1 for Example 2 and 180°–248° C. and 19.6 for Example 3.

Separately, Example 2 was repeated except that the chelate compound II was not added (Comparative Example 1), and Example 2 was again repeated except that the ratio of modification with the chelate compound II was adjusted at 2.3 mol % (Comparative Example 2).

These conditions and the results of evaluation on the obtained fibers are summarized in Table 1.

The fiber obtained in Example 2 had, although its strength was a little inferior to that of Comparative Example 1, in which no chelate compound II was added, a WTb about 30° C. higher than that of Comparative Example 1 and an excellent belt bending fatigue resistance, thus proving to be a high-value fiber.

The fiber obtained in Comparative Example 2, modified with chelate compound II in a ratio of 2.3 mol %, decomposed during drawing to discolor. The total drawing ratio was therefore decreased to 17.4, and the obtained fiber had a single fiber strength of only 17.2 g/d. Although the fiber had a high WTb of 179° C., it had a poor resistance to dry heat ageing perhaps due to large amount of radicals formed by decomposition and a poorer fatigue resistance with rubber than that of Example 2.

The fiber of Example 3, obtained from a PVA having a $P_A$ of 17,000, had a high single fiber strength and elastic modulus of 23.6 g/d and 530 g/d respectively and a high WTb of 182° C. The fiber was also excellent in resistance to dry heat ageing and fatigue resistance with rubber, thus proving to be a PVA fiber having excellent, well-balanced properties that had not been available in the past. The fiber is expected to be usable widely in industrial fields.

TABLE 1

| | Degree of polymerization $P_A$ | Drawing Temperature (°C.) | Drawing Draw ratio (times) | Ratio of modification with chelate compound II (mol %) | Single fiber fineness (g/d) | Single fiber Strength (g/d) | Single fiber Elastic modulus (g/d) | WTb (°C.) | Resistance to heat ageing Strength retention (%) (°C.) (hr) 160 × 24 | Resistance to heat ageing Strength retention (%) (°C.) (hr) 160 × 48 | Fatigue in rubber Strength retention (%) |
|---|---|---|---|---|---|---|---|---|---|---|---|
| Example 1 | 4,000 | 230 | 21.0 | 0.1 | 3.3 | 20.1 | 440 | 157 | 86 | 73 | 70 |
| Example 1 | 8,000 | 240 | 20.1 | 0.06 | 2.9 | 21.9 | 495 | 168 | 81 | 67 | 75 |
| Example 3 | 17,000 | 248 | 19.6 | 0.03 | 2.3 | 23.6 | 530 | 182 | 75 | 62 | 79 |
| Compara- | 8,000 | 240 | 20.1 | 0 | 2.9 | 22.4 | 508 | 139 | 85 | 69 | 59 |

TABLE 1-continued

| | Degree of polymerization $P_A$ | Drawing | | Ratio of modification with chelate compound II (mol %) | Single fiber | | | | Resistance to heat ageing | | Fatigue in rubber |
| | | Temperature (°C.) | Draw ratio (times) | | fineness (g/d) | Strength (g/d) | Elastic modulus (g/d) | WTb (°C.) | Strength retention (%) | | Strength retention (%) |
| | | | | | | | | | (°C.) (hr) 160 × 24 | (°C.) (hr) 160 × 48 | |
| tive Example 1 | | | | | | | | | | | |
| Comparative Example 2 | 8,000 | 240 | 17.4 | 2.3 | 3.0 | 17.2 | 355 | 179 | 25 | 8 | 55 |

EXAMPLE 4

A PVA having a viscosity average polymerization degree of 1,700 and a saponification degree of 99.5 mol % was dissolved in water in a concentration of 17% by weight. The solution was extruded through a spinneret with 1,000 holes having a diameter of 0.08 mm at 105° C. by wet spinning. The coagulating bath was an aqueous solution containing 6 g/l of sodium hydroxide and 300 g/l of sodium sulfate at 75° C. The extruded streams were wet drawn by 3 times and then neutralized through an aqueous solution containing 70 g/l of sulfuric acid and 30 g/l of sodium sulfate at 30° C., to form a yarn. In the next step, the yarn was wet drawn by 1.7 times through an aqueous solution containing 350 g/l of sodium sulfate at 95° C. and washed with water. Thereafter, a 2% aqueous solution of the same chelate compound as used in Example 1 was applied to the yarn, and the yarn was dried at 130° C. The as-spun yarn thus obtained was drawn through hot air ovens at temperatures of 180°-200°-235° C. to a total draw ratio of 21.0.

The drawn fiber had a ratio of modification with chelate compound of 0.27 mol % and had a single fiber fineness, strength and WTb of 1.8 deniers, 14.9 g/d and 146° C., respectively.

EXAMPLE 5

A PVA having a viscosity average polymerization degree of 21,000 and a saponification degree of 99.9 mol % was added to glycerine in such an amount as to make the concentration 5.0% by weight and dissolved therein at 180° C. The solution was extruded through a spinneret with 400 holes having a diameter of 0.21 mm at 230° C. to effect dry-jet-wet spinning. The coagulating bath comprised methanol/glycerine=8/2 by weight and had a temperature of $-5$ ° C., where the extruded streams yield transparent gel filaments. The filaments were wet drawn by 4 times through a methanol bath at 40° C. Thereafter, the glycerine was extracted with methanol and the filaments were dried with hot air at 110° C., to give an as-spun yarn. The as-spun yarn thus obtained was dry heat drawn through 2 radiation ovens at temperatures of 200° C. and 261° C. to a total draw ratio of 19.5.

The drawn fiber had a single fiber strength and elastic modulus of 26.2 g/d and 630 g/d, respectively and a WTb of 150° C. To the drawn yarn a 1% by weight solution in methanol of a chelate compound II with $M=Cr$, $R=CC_{11}H_{23}$ and $X_1-X_4=OH$ was applied, and the yarn was heat treated, while being elongated by 1%, under tension at 190° C. for 1 minute. The obtained yarn had a chrome content of 0.21 mol %. The yarn, with no sticking of individual filaments, had a single fiber fineness, strength and modulus of 2.1 deniers, 24.6 g/d and 610 g/d and a WTb of 185° C., thus proving to be a high-performance fiber that had never been seen before.

The fiber had high strength retentions after heating at 160° C. for 24 hours and 48 hours of 76% and 62%, respectively, and maintained a strength retention of 81% after belt bending test at 100° C. of 30,000 times.

EXAMPLE 6

Radical polymerization of ethylene and vinyl acetate was effected with a polymerization catalyst of methanol and a polymerization initiator of azobis-4-methyloxy-2,4-dimethylvaleronitrile at 60° C. and under pressure, to obtain an ethylene-vinyl acetate random copolymer having an ethylene content of 44 mol % and a viscosity average polylmerization degree of about 800.

The ethylene-vinyl acetate copolymer (hereinafter referred to as "Et/VAc copolymer") thus obtained was saponified in a sodium hydroxide solution in methanol, to give an Et/VA copolymer, in which at least 99 mol % of vinyl acetate units had been saponified, in a wet state. The Et/VA copolymer was repeatedly washed with a large excess of pure water containing a small amount of acetic acid and then repeatedly washed with a large excess of pure water, to reduce its alkali metal ion content and alkali earth metal ion content both down below about 10 ppm. Thereafter, water was separated from the copolymer in a water separator and the copolymer was sufficiently dried by vacuum drying at a temperature of below 100° C., to give an Et/VA copolymer having an intrinsic viscosity as determined in a 85%-water-containing phenol solvent at 30° C. of $[\eta]=1.05$ dl/g.

The ET/VA copolymer thus obtained was melt extruded through a spinneret at 260° C. and taken up at a spinning speed of 1,000 m/min. The as-spun filaments were heat drawn in a ratio of 2, to give a 50 deniers/24 filaments Et/VA multifilament yarn. The fiber formation operation was stable with no troubles.

The multifilament yarn thus obtained was used as both warp and weft and woven into a taffeta.

The grey taffeta obtained was de-sized by treating with an aqueous solution containing 1 g/l of sodium hydroxide and 0.5 g/l of ACTINOL R-100 (surfactant, made by Matsumoto Yushi-Seiyaku Co.) at 80° C. for 30 minutes. Then, the fabric was immersed in each of treating baths having different concentrations of chelate compound II as shown below at room temperature for 10 seconds.

Compositions of treating baths

Chelate compound IIa: Concentrations shown in Table 2 (ZEVLAN CR-N; purity 25%)

Hexamethylenetetramine : (Conc. of IIa)×0.05%

The taffeta fabrics were taken out from the treating baths, squeezed through a mangle to a pick-up of 60%, predried at 70° C. and dried at 150° C. for 1 minute. The taffeta fabrics were then each dyed in a dyeing bath having the following composition at 100° C. for 40 minutes.

| Dyeing bath composition | |
| --- | --- |
| Dye: Sumikaron Blue SE-RPD (made by Sumitomo Chemical Co.) | 2% owf |
| Dispersing agent: Nikka Sansolt 7000 (made by Nikka Chemical Ind. Co.) | 0.5 g/l |
| pH adjusting agents | |
| Ammonium sulfate | 1 g/l |
| Acetic acid (48%) | 1 cc/l |
| Bath ratio 50:1 | |

The dyed fabrics obtained were dried and tested for the ratio of modification of with chelate compound IIa, degree of exhaustion and shrinkage by the methods described before. The hot water resistance of the fabrics was evaluated by checking luster and hand before and after dyeing and by, after steam ironing the fabrics covered with another cloth, checking whether they became rigid or not.

The results are shown in Table 2.

TABLE 2

| | Concentration of compound IIa in treating bath (%) | | | | |
| --- | --- | --- | --- | --- | --- |
| | 0 | 3 | 5 | 10 | 45 |
| Ratio of modification with compound IIa | | | | | |
| Before dyeing (mol %) | 0 | 0.5 | 0.6 | 1.2 | 3.5 |
| After dyeing (mol %) | 0 | 0.5 | 0.6 | 1.2 | 3.0 |
| Degree of exhaustion (%) | — | 95 | 90 | 85 | 20 |
| Hot water resistance | | | | | |
| Luster | | | | | |
| Before dyeing | ○ | ○ | ○ | ○ | x |
| After dyeing | x | ○ | ○ | ○ | x |
| Hand | | | | | |
| Before dyeing | ○ | ○ | ○ | ○ | x |
| After dyeing | x | ○ | ○ | ○ | x |
| Hand after steam ironing | x | ○ | ○ | ○ | ○ |
| Shrinkage after dyeing (%) | 25 | 1.5 | 1.0 | 0.5 | 2.0 |
| Remarks | (a) | | | | (b) |

Rating of luster:
○: good luster with depth;
x: whitish, without depth
Rating of hand:
○: soft and good touch
x: rigid and coarse touch
Rating of hand after ironing:
○: soft and good touch;
x: rigid and coarse touch
(a): Shrinkage and sticking occurred during dyeing.
(b): Stiffened by modification with compound IIa.

The above results shows that ratio of modification with compound IIa in a range of 0.05 to 2 mol % based on the moles of the alcoholic hydroxyl groups in an Et/VA copolymer improves the hot water resistance of fabrics comprising the Et/VA copolymer, thereby preventing the fabrics from shrinking or sticking upon treatment with high-temperature water, such as dyeing or steam ironing and maintaining their good luster and hand. Such modification also assures high degree of exhaustion of dye, whereby the fabrics are dyeable to bright colors.

COMPARATIVE EXAMPLE 3

The Et/VAc copolymer having an ethylene content of 44 mol % and a viscosity average polymerization degree of about 800 as obtained in Example 6 was, as it is without saponification, melt spun and drawn, to give a 50 deniers/24 filaments multifilament yarn. The yarn was used as both warp and weft and woven into a taffeta.

The taffeta obtained was de-sized in the same manner as in Example 6 and then immersed in a treating bath containing 10% of the compound IIa and 0.05% of hexamethylenetetramine at room temperature for 10 seconds. After pre-drying, the fabric was, in the same manner as in Example 6, heat treated and dyed, to give a dyed taffeta fabric comprising Et/VAc copolymer fiber.

The taffeta fabric was tested for the ratio of modification with chelate compound IIa, degree of exhaustion and shrinkage by the methods described before, and also for hot water resistance in the same manner as in Example 6. The results are shown in Table 3.

TABLE 3

| | Comparative Example 3 |
| --- | --- |
| Fiber-forming polymer | Et/VAc copolymer |
| Ratio of modification with compound IIa | |
| Before dyeing (mol %) | 1.2 |
| After dyeing (mol %) | 0.02 |
| Degree of exhaustion (%) | 85 |
| Hot water resistance | |
| Luster | |
| Before dyeing | ○ |
| After dyeing | x[1)] |
| Hand | |
| Before dyeing | ○ |
| After dyeing | x[1)] |
| Hand after steam ironing | x |
| Shrinkage after dyeing (%) | 30 |
| Remarks | (a) |

The ratings of luster and hand are the same as for Table 2.
[1)] Became rubber-like and did not maintain fiber form.
(a): Shrinkage and sticking occurred during dyeing.

It is understood from Table 3 that: with a fabric comprising an Et/VAc copolymer with its vinyl acetate units not saponified, the ratio of modification with compound IIa decreases to a large extent after dyeing, whereby the hot water resistance deteriorates markedly and the fabric shrinks and sticks upon dyeing to deteriorate its luster and hand.

EXAMPLE 7

Et/VA copolymers having ethylene contents as shown in Table 4 and a saponification degree of vinyl acetate component of 99% were each melt extruded at a spinneret temperature of 260° C. and the extruded streams were taken up at a spinning speed of 1,000 m/min. The as-spun yarn was heat drawn by 2 times, to give an Et/VA copolymer multifilament yarn of 75 deniers/36 filaments.

The multifilament yarns thus obtained were each used as both warp and weft and woven into a taffeta. The taffeta fabrics thus obtained were, in the same manner as in Example 6, provided with chelate compound IIa and heat treated and dyed, except that the concentration of compound IIa in the treating bath was adjusted at 10%.

The results of evaluation conducted in the same manner as in Example 6 are shown in Table 4 below.

TABLE 4

| | Ethylene content (mol %) | | | |
| --- | --- | --- | --- | --- |
| | 25 | 35 | 60 | 80 |
| Spinnability of Et/Va copolymer | Poor[1)] | Good | Good | Good |
| Ratio of modification with compound IIa | | | | |
| Before dyeing (mol %) | — | 1.2 | 0.6 | 0.5 |
| After dyeing (mol %) | — | 1.2 | 0.6 | 0.03 |
| Degree of exhaustion (%) | — | 75 | 80 | 40 |

TABLE 4-continued

| | Ethylene content (mol %) | | | |
|---|---|---|---|---|
| | 25 | 35 | 60 | 80 |
| Hot water resistance | | | | |
| Luster | | | | |
| Before dyeing | — | ○ | ○ | ○ |
| After Dyeing | — | ○ | ○ | x |
| Hand | | | | |
| Before dyeing | — | ○ | ○ | ○ |
| After Dyeing | — | ○ | ○ | x |
| Hand after steam ironing | — | ○ | ○ | x |
| Shrinkage after dyeing (%) | — | 1.0 | 2.5 | 20 |

[1]Spinning was not possible because of poor threadability

The ratings of evaluation for luster and hand are the same as in Table 2.

It is clear from Table 4 that: while an Et/VA copolymers having too low an ethylene content has poor fiber formability and its spinning becomes impossible, those having too high an ethylene content have poor hand and can be modified with compound IIa to a small extent only, whereby its hot water resistance becomes poor.

EXAMPLE 8

Each one of Et/VA copolymers having ethylene content as shown in Table 5 and a polyethylene terephthalate (PET) having an [$\eta$] as determined a 1/1 by weight mixed solvent of phenol/tetrachloroethane at 30° C. of 0.67 dl/g were, in weight ratios as shown in Table 5, subjected to composite spinning and drawing, to give a composite multifilament yarn of 50 deniers/24 filaments, each of the filaments being a 2-layer coaxial sheath-core composite filament having a true circular cross-section in which Et/VA constitutes the sheath and PET the core.

The obtained composite filament yarns thus obtained were each used as both warp and weft and woven into a plain weave fabric. The fabrics were de-sized in the same manner as in Example 6 and then modified with compound IIa in the same manner as in Example 6, except that the concentration of compound IIa in the treating bath was adjusted at 5%.

The plain weave fabrics were then each dyed in a dyeing bath having the following composition at 115° C. for 40 minutes.

| Dyeing bath composition | |
|---|---|
| Dye: Sumikaron Blue SE-RPD. (made by Sumitomo Chemical Co.) | 2% owf |
| Dispersing agent: Nikka Sansolt 7000 | 0.5 g/l |
| pH adjusting agents | |
| Ammonium sulfate | 1 g/l |
| Acetic acid (48%) | 1 cc/l |
| Bath ratio 50:1 | |

The dyed fabrics obtained were dried and tested for the ratio of modification of the Et/VA copolymer with chelate compound IIa. The dyed fabrics were tested for hot water resistance by checking luster and hand before and after dyeing. The results are shown in Table 5.

From Table 5, it is apparent that the composite fiber of the present invention modified with compound IIa has excellent hot water resistance and does not deteriorate its luster and hand even by high-temperature dyeing. It is also seen that: for achieving good fiber formation operation, it is necessary to select appropriately the ethylene content in the Et/VA copolymer and the composite ratio in the composite fiber between the Et/VA copolymer and polyester.

TABLE 5

| Ratio of copolymerization of Et (mol %) | Composite ratio Et/VA: PET (weight) | Spinnability | Ratio of modification with compound IIa (mol %) | | Luster | | Hand | |
|---|---|---|---|---|---|---|---|---|
| | | | Before dyeing | After dyeing | Before dyeing | After dyeing | Before dyeing | After dyeing |
| 20 | 50:50 | not spinnable | — | — | — | — | — | — |
| 33 | 50:50 | good | 0.5 | 0.5 | ○ | ○ | ○ | ○ |
| 44 | 5:95 | not spinnable | — | — | — | — | — | — |
| 44 | 30:70 | good | 0.3 | 0.3 | ○ | ○ | ○ | ○ |
| 44 | 50:50 | good | 0.4 | 0.4 | ○ | ○ | ○ | ○ |
| 44 | 70:30 | good | 0.6 | 0.6 | ○ | ○ | ○ | ◉ |
| 44 | 95:5 | not spinnable | — | — | — | — | — | — |
| 60 | 50:50 | good | 0.4 | 0.4 | ○ | ○ | ○ | ○ |
| 75 | 50:50 | good | 0.2 | 0.03 | ○ | x | ○ | x |

Rating of luster:
○: good deep luster
x: White luster without deepness
Rating of hand:
◉: Soft and bulky
○: Soft
x: Rigid, stuck together

EXAMPLE 9

An Et/VA copolymer having an ethylene content of 44 mol % and an intrinsic viscosity of [$\eta$]=1.10 dl/g and a polyethylene terephthalate copolymerized with 8 mol % of isophthalic acid (hereinafter referred to as "PET copolymer") and having an intrinsic viscosity at spinning of [$\eta$]=0.65 dl/g were composite-melt spun in a ratio by weight of 1:1 at a spinning temperature of 265° C. and a take-up speed of 1,000 m/min, to give 2-layer coaxial sheath-core composite filaments each having a true circular cross-section and in which the Et/VA copolymer constituted the sheath and the PET copolymer the core.

The composite yarn obtained was drawn through a conventional roll-plate drawing machine, where the yarn touched a hot roll at 75° C. and hot plate at 120°

C., in a draw ratio of 4.1 to give a composite drawn yarn of 50 deniers/24 filaments.

The composite drawn yarn thus obtained was used as both warp and wefts, the warp comprising a twisted yarn of Z-twist 300 T/m and the wefts comprising hard twist yarns of Z-twist 2,500 T/m and S-twist 2,500 T/m, 2 pieces each being alternately inserted, and woven into a satin crepe. The grey fabric had a warp density of 164 pieces/inch and a weft density of 97 pieces/inch.

The grey satin crepe obtained was dry heat treated through a Shrink Suffer machine at 150° C. under relaxed condition, and then scoured and de-sized by treating with an aqueous solution containing 1 g/l of sodium hydroxide and 0.5 g/l of ACTINOL R-100 at 80° C. for 30 minutes. Then, the fabric was immersed in a treating bath having the following composition at room temperature.

| Compositions of treating bath | |
|---|---|
| Chelate compound IIa (ZEVLAN CR-N; purity 25%) | 5% |
| Glycerine | 2% |
| Hexamethylenetetramine | 0.25% |

The fabric was taken out from the treating bath, squeezed through a mangle to a pick-up of 60%, pre-dried at 70° C. and heat treated at 150° C. for 1 minute.

The fabric was then dyed in a dyeing bath having the following composition at 120° C. for 40 minutes.

| Dyeing bath composition | |
|---|---|
| Dye: Miketon Polyester Navy Blue GLSF conc. (made by Mitsui Toatsu Chemicals, Inc.) | 5% owf |
| Dispersing agent: Nikka Sansolt 7000 | 0.5 g/l |
| pH Adjusting agents | |
| Ammonium sulfate | 1 g/l |
| Acetic acid (48%) | 1 cc/l |
| Bath ratio 50:1 | |

The dyed fabric was taken out from the bath, washed with warm water at 80° C. for 30 minutes and then subjected to a final heat treatment at 140° C. for 1 minute. The thus treated fabric was tested for the ratio of modification of Et/VA copolymer with chelate compound IIa and hot water resistance, which was evaluated by checking luster and hand before and after dyeing. The results are shown in Table 6.

EXAMPLE 10

The procedure of Example 9 was followed except that the dry heat treatment before de-sizing and at 150° C. under relaxed condition was not conducted, to prepare a satin crepe and conduct its dyeing and final heat treatment. The obtained dyed fabric was tested for the ratio of modification of Et/VA copolymer with chelate compound IIa and hot water resistance, in the same manner as in Example 9. The results are also shown in Table 6.

COMPARATIVE EXAMPLE 4

The procedure of Example 9 was followed except that the modification with compound IIa was not conducted and that the dyeing was carried out by high-temperature liquid current process at 120° C., to prepare a satin crepe and conduct its dyeing and final heat treatment. The obtained dyed fabric was tested for the ratio of modification of Et/VA copolymer with chelate compound IIa and hot water resistance, in the same manner as in Example 9. The results are also shown in Table 6.

TABLE 6

| | Example 9 | Example 10 | Comp. Ex. 4 |
|---|---|---|---|
| Heat treatment of grey fabric at 150° C. | yes | no | yes |
| Modification with compound IIa | yes | yes | no |
| Ratio of modification with compound IIa (mol %) | 0.6 | 0.3 | 0 |
| Hot water resistance | | | |
| Luster | | | |
| Before dyeing | ◉ | ○ | ○ |
| After dyeing | ◉ | ○ | x |
| Hand | | | |
| Before dyeing | ◉ | ○ | ○ |
| After dyeing | ◉ | ○ | x |

Rating of luster:
◉: excellent luster with depth
○: excellent luster with depth
x: whitish, without depth
Rating of hand:
◉: soft and bulky
○: soft
x: stiff with sticking It is understood from Table 6 that the fabrics of Examples 9 and 10, which had been modified with compound IIa, had good hot water resistance, thereby capable of maintaining, even when dyed at a high temperature, good quality with no decrease of luster and hand. In particular the fabric of Example 9, which had been heat treated at high temperature before treatment with compound IIa, had still improved hot water resistance and still better fabric quality. On the other hand, the fabric of Comparative Example 4, which had not been treated with compound IIa, showed no improvement in hot water resistance and stuck by heating upon dyeing.

EXAMPLE 11

The procedure of Example 9 was followed to prepare a grey satin crepe, which was then dry heat treated at 150° C. under relaxed condition and scoured and de-sized in the same manner. The fabric was then wrapped around a square pillar and immersed in a treating bath having the following composition at 30° C. for 3 hours.

| Compositions of treating bath | |
|---|---|
| Chelate compound IIa (ZEVLAN CR-N; purity 25%) | 5% |
| Hexamethylenetetramine | 0.25% |

The fabric was taken out from the treating bath, squeezed through a mangle to a pick-up of 60%, pre-dried at 70° C. and heat treated at 140° C. for 1 minute.

The fabric was then dyed in dyeing baths having the following compositions at 135° C. for 40 minutes.

| Dyeing bath composition | |
|---|---|
| Dye: Kayalon Polyester Black G-SF (made by Nippon Kayaku Co.) | 5% owf |
| Dispersing agent: Tohosolt TD (made by Toho Chemical Ind. Co.) | 0.5 g/l |
| pH adjusting agents: Ultra Mt-N$_2$ (made by Daiwa Kagaku Kogyo Co.) | 0.7 g/l |

Boric acid concentration: as shown in Table 7

Sodium sulfate concentration: as shown in Table 7
Bath ratio 50:1

The dyed fabric was taken out from the bath and subjected to the usual reduction cleaning. The fabric was then dyed at a high temperature of 135° C. and then tested for shrinkage (widthwise) and also for hot water resistance, which was evaluated by checking luster and hand. The results are shown in Table 7.

TABLE 7

| Boric acid conc. (g/l) | sodium sulfate conc. (g/l) | Widthwise shrinkage of fabric (%) | Hand of dyed fabric | Appearance of dyed fabric |
|---|---|---|---|---|
| 0 | 0 | 30 | Stuck a little, large shrinkage | Whitened, dull |
| 1 | 0 | 25 | Stuck a little, large shrinkage | " |
| 1 | 1 | 20 | Stuck a little, large shrinkage | " |
| 2 | 2 | 5 | Very bulky | Calm luster |
| 5 | 0 | 5 | " | " |
| 30 | 0 | 2 | Very bulky, with drape | " |
| 30 | 30 | 0.5 | Very bulky, with drape and flexibility | Good luster |

It is understood from Table 7 that addition of boric acid or boric acid and sodium sulfate to a dyeing bath prevents the fabric dyed even at as high a temperature as 135° C. from shrinking and realizes smooth dyeing, whereby the obtained dyed fabric exhibits excellent hand, appearance and color.

EXAMPLE 12

The procedure of Example 9 was followed to prepare a grey satin crepe, which was then dry heat treated at 150° C. under relaxed condition and scoured and desized in the same manner. The fabric was then immersed in a treating bath having the following composition at room temperature.

| Compositions of treating bath | |
|---|---|
| Chelate compound IIb (Octanoic acid aluminum chloride; purity 20%) | 5% |
| 1,9-nonanedial | 0.8% |
| Isopropyl alcohol | 3% |
| Hexamethylenetetramine | 0.25% |

The fabric was taken out from the treating bath and squeezed through a mangle to a pick-up of 60%. The fabric was then wound onto a beam and the beam with the fabric was wrapped in a polyethylene film and sealed therein. The package was allowed to stand, while being rotated, at room temperature for 24 hours. Thereafter, the fabric was, while being unwound from the beam, predried at 70° C. and heat treated at 150° C. for 1 minute.

The fabric was then dyed in a dyeing bath having the following composition at 120° C. for 40 minutes.

| Dyeing bath composition | |
|---|---|
| Dye: Sumikaron Blue SE-RPD (made by Sumitomo Chemical Co.) | 2% owf |
| Dispersing agent: Nikka Sansolt 7000 | 0.5 g/l |
| pH adjusting agents | |
| Ammonium sulfate | 1 g/l |
| Acetic acid (48%) | 1 cc/l |
| Sodium sulfate | 20 g/l |

| Dyeing bath composition | |
|---|---|
| Boric acid | 20 g/l |
| Bath ratio 50:1 | |

The dyed fabric was taken out from the bath, washed with warm water at 80° C. for 30 minutes and then subjected to a final heat treatment at 130° C. for 1 minute. The fabric was tested for the ratio of modification with compound IIb and also for hot water resistance in the same manner as in Example 9. The results are shown in Table 8.

COMPARATIVE EXAMPLE 5

Example 12 was repeated except that the modification with compound IIb was not conducted and that the dyeing was conducted by high-temperature liquid current dyeing at 120° C., to obtain a satin fabric dyed and heat treated. The obtained fabric was tested for the ratio of modification with compound IIb and also for hot water resistance in the same manner as in Example 11. The results are shown in Table 8.

TABLE 8

| | Example 12 | Comp. Ex. 5 |
|---|---|---|
| Modification with compound IIb | yes | no |
| Ratio of modification with compound IIb (Mol %) | 0.3 | o |
| Hot water resistance | | |
| Luster | | |
| Before dyeing | ⊙ | ○ |
| After dyeing | ⊙ | x |
| Hand | | |
| Before dyeing | ⊙ | ○ |
| After dyeing | ⊙ | x |

The ratings of evaluation for luster and hand are the same as those in Table 6.

It is understood from Table 8 that a fabric having good luster, hand and the like can be obtained also with chelate compound II in which the metal atom is aluminum.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A composite fiber comprising:
   (a) a vinyl alcohol units-containing polymer component, said component comprising vinyl alcohol units in which the alcoholic hydroxyl group is modified with at least one group of the following formula I

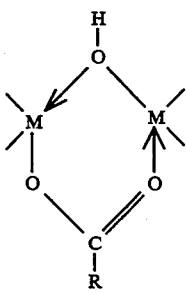

wherein M is a chelate-forming metal atom and R is an alkyl group; and (b) a fiber-forming polymer component other than the one described in part (a).

2. The composite fiber according to claim 1, wherein said vinyl alcohol units-containing polymer contains 30 to 70 mol % of vinyl alcohol units based on the total moles of repeating units, said vinyl alcohol units including those modified with a group having formula I.

3. The composite fiber according to claim 1, wherein said vinyl alcohol units-containing polymer contains 30 to 70 mol % of ethylene units based on the total moles of repeating units.

4. The composite fiber according to claim 1, wherein said vinyl alcohol units-containing polymer is a polyvinyl alcohol having a viscosity average polymerization degree of at least 1,000.

5. The composite fiber according to claim 1, wherein 0.02–2 mol %, based on the total amount of said vinyl alcohol units, of said vinyl alcohol units-containing polymer is modified with at least one of the groups presented by formula I.

6. The composite fiber according to claim 1, wherein M in formula I is a chrome atom or an aluminum atom.

7. The composite fiber according to claim 1, wherein the ratio by weight of (a) said component the modified vinyl alcohol units-containing polymer and (b) said another fiber-forming polymer component is in a range of 90 to 90:10.

8. The composite fiber according to claim 1, wherein said fiber-forming polymer other than the one described in part (a) is polyester, polyamide or polyolefin.

9. A yarn or textile product comprising the composite fiber according to claim 1.

* * * * *